US008576467B2

(12) United States Patent
Tomioka

(10) Patent No.: US 8,576,467 B2
(45) Date of Patent: Nov. 5, 2013

(54) OPTICAL SCANNING APPARATUS AND IMAGE FORMING APPARATUS

(75) Inventor: Hiroyuki Tomioka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 212 days.

(21) Appl. No.: 13/165,836

(22) Filed: Jun. 22, 2011

(65) Prior Publication Data

US 2012/0002260 A1    Jan. 5, 2012

(30) Foreign Application Priority Data

Jun. 30, 2010 (JP) ................................. 2010-150160

(51) Int. Cl.
G02B 26/08 (2006.01)

(52) U.S. Cl.
USPC .................. 359/201.1; 359/201.2; 359/204.1

(58) Field of Classification Search
USPC .......... 359/201.2, 204.1–204.4, 196.1–226.2; 347/225, 232–235, 242–245, 257–261
See application file for complete search history.

(56) References Cited

U.S. PATENT DOCUMENTS

2008/0094678 A1*  4/2008  Uduki ........................... 359/204

FOREIGN PATENT DOCUMENTS

JP   2004-258102 A    9/2004
JP   2006-184622 A    7/2006

OTHER PUBLICATIONS

English Machine Translation of JP 2006-184622.

\* cited by examiner

*Primary Examiner* — James Phan

(57) ABSTRACT

The present invention provides an optical scanning apparatus at least including two optical scanning units that freely rotate about a rotation shaft and are disposed in parallel to the rotation shaft; two light sources provided for each optical scanning unit in relation to the optical scanning unit; and four primary mirrors provided respectively opposite and sandwiching the optical scanning unit, and the mirrors reflecting the light from the light source that is scanned by the optical scanning unit, wherein the first optical path that extends from a first optical scanning unit to one primary mirror that corresponds to the first optical scanning unit and a second optical path that extends from a second optical scanning unit to one primary mirror that corresponds to the second optical path are formed to overlap in a vertical orientation on a sectional surface including both rotation shafts of the two optical scanning units.

5 Claims, 5 Drawing Sheets

OPTICAL SCANNING APPARATUS AND IMAGE FORMING APPARATUS

This application is based on and claims the benefit of priority from Japanese Patent Application No. 2010-150160, filed on 30 Jun. 2010, the content of which is incorporated herein by reference.

BACKGROUND OF THE INVENTION

1. Field of the Invention

The present invention relates to an optical scanning apparatus and an image forming apparatus including the optical scanning apparatus.

2. Related Art

A known optical scanning apparatus typically includes two optical scanning units such as a polygon mirror, two light sources provided respectively corresponding to each optical scanning unit, and four primary mirrors provided respectively opposite and sandwiching each optical scanning unit to reflect light from each light source that is scanned by each optical scanning unit. The optical scanning units are driven to rotate about a rotation shaft, and the rotation shafts are configured in parallel. An example of this type of optical scanning unit is illustrated in FIG. 1.

FIG. 1 is a sectional view of the above type of conventional light scanning apparatus X1.

As illustrated in FIG. 1, the conventional optical scanning apparatus X1 includes two polygon mirrors PM1, PM2, a light source (not shown) provided at two positions corresponding to each polygon mirror PM, and four primary mirrors M11, M12, M21, M22 provided respectively opposite and sandwiching each polygon mirror PM to reflect light from each light source that is scanned by each polygon mirror PM. L11-1, L11-2 (or L12-1, L12-2, L21-1, L21-2, L22-1, L22-2) are respectively f-theta lenses. FIG. 1 illustrates a configuration of one group formed by two f-theta lenses.

In FIG. 1, reference numeral 1 (1BK, 1M, 1Y, 1C) denotes a photosensitive member. A laser beam (hereinafter referred to as "light") emitted from each light source is scanned by the rotating polygon mirror PM, passes through the f-theta lenses L11-1, L11-2 (or L12-1, L12-2, L21-1, L21-2, L22-1, L22-2), is reflected by the primary mirror M11 (or M12, M21, M22), and becomes incident upon the photosensitive member 1 to thereby form an electrostatic latent image.

This type of light scanning apparatus X1 allocates one polygon mirror PM with respect to two light sources, and therefore enables a reduction in the number of polygon mirrors. As a result, the light scanning apparatus X1 can reduce manufacturing costs.

However, the light scanning apparatus X1 as illustrated in FIG. 1 is configured by one polygon mirror PM, two primary mirrors M11, M12 (or M21, M22) provided opposite and sandwiching the polygon mirror PM and reflecting light scanned by the polygon mirror PM, and thereby, configures a single light scanning unit PU. The problem arises that the two light scanning units PU, PU as illustrated in the figure are merely have a simple configuration along a plane, and therefore the length K in the direction of orientation of the optical scanning units PU, PU as shown by the arrow Y is increased, and the overall apparatus size is increased.

SUMMARY OF THE INVENTION

Therefore, the present invention is proposed to solve the above problems in the conventional art, and has the object of providing an optical scanning apparatus that reduces the length in direction of orientation of optical scanning units PU, PU and downsizes the overall size of the apparatus, and to provide an image forming apparatus that includes this type of optical scanning apparatus.

The present invention provides an optical scanning apparatus at least including two optical scanning units that freely rotate about a rotation shaft and are disposed in parallel to the rotation shaft; two light sources provided for each optical scanning unit in relation to the optical scanning unit; and four primary mirrors provided respectively opposite and sandwiching the optical scanning unit, and the mirrors reflecting the light from the light source that is scanned by the optical scanning unit, wherein the first optical path that extends from a first optical scanning unit to one primary mirror that corresponds to the first optical scanning unit and a second optical path that extends from a second optical scanning unit to one primary mirror that corresponds to the second optical path are formed to overlap in a vertical orientation on a sectional surface including both rotation shafts of the two optical scanning units.

The optical scanning apparatus according to the present invention enables a reduction in the length of a first optical path direction and a second optical path direction in the optical scanning apparatus (in other words, the orientation direction of the optical scanning units), and also enables downsizing of the overall apparatus.

DETAILED DESCRIPTION OF THE INVENTION

Actual embodiments of the present invention will be described hereafter making reference to the attached figures.

Figure 4:
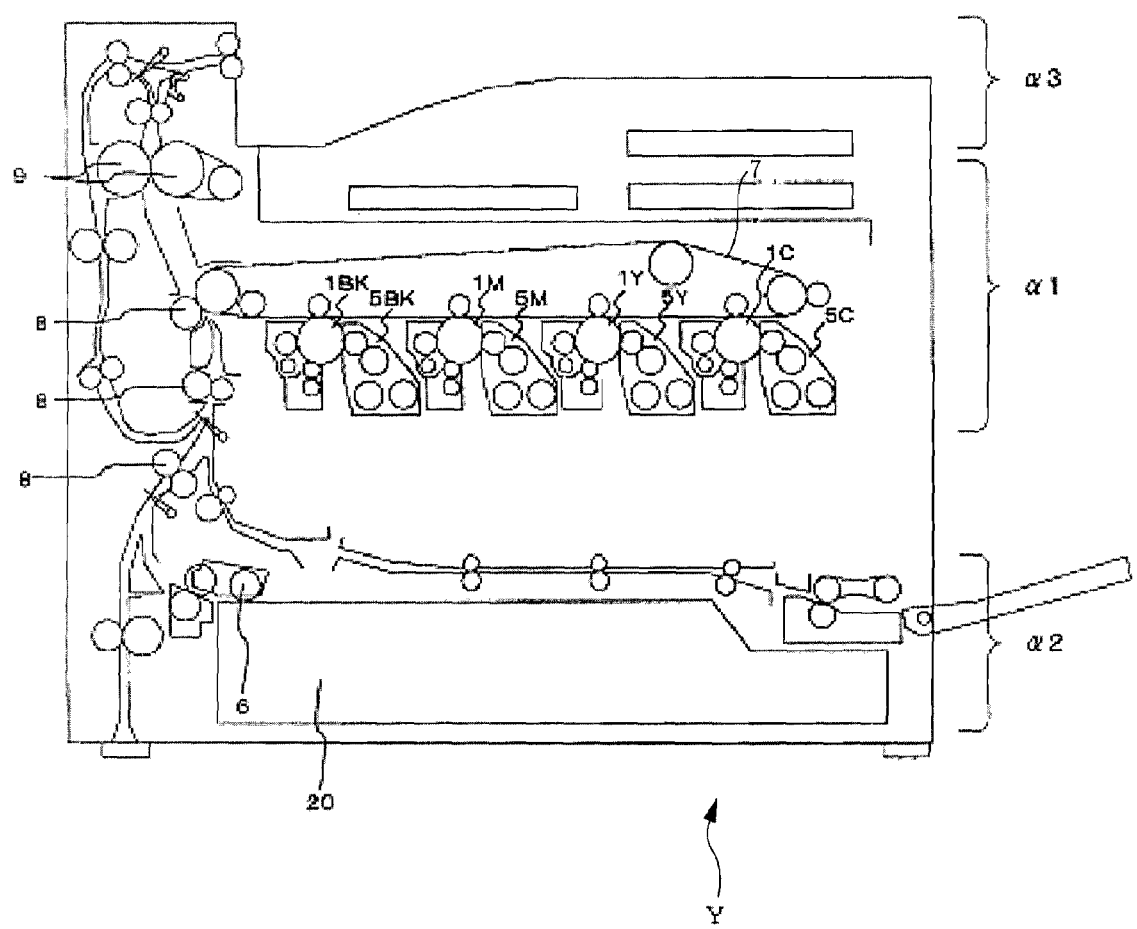
FIG. 4 illustrates the overall image forming apparatus according to the present embodiment of the present invention.
Figure 5:
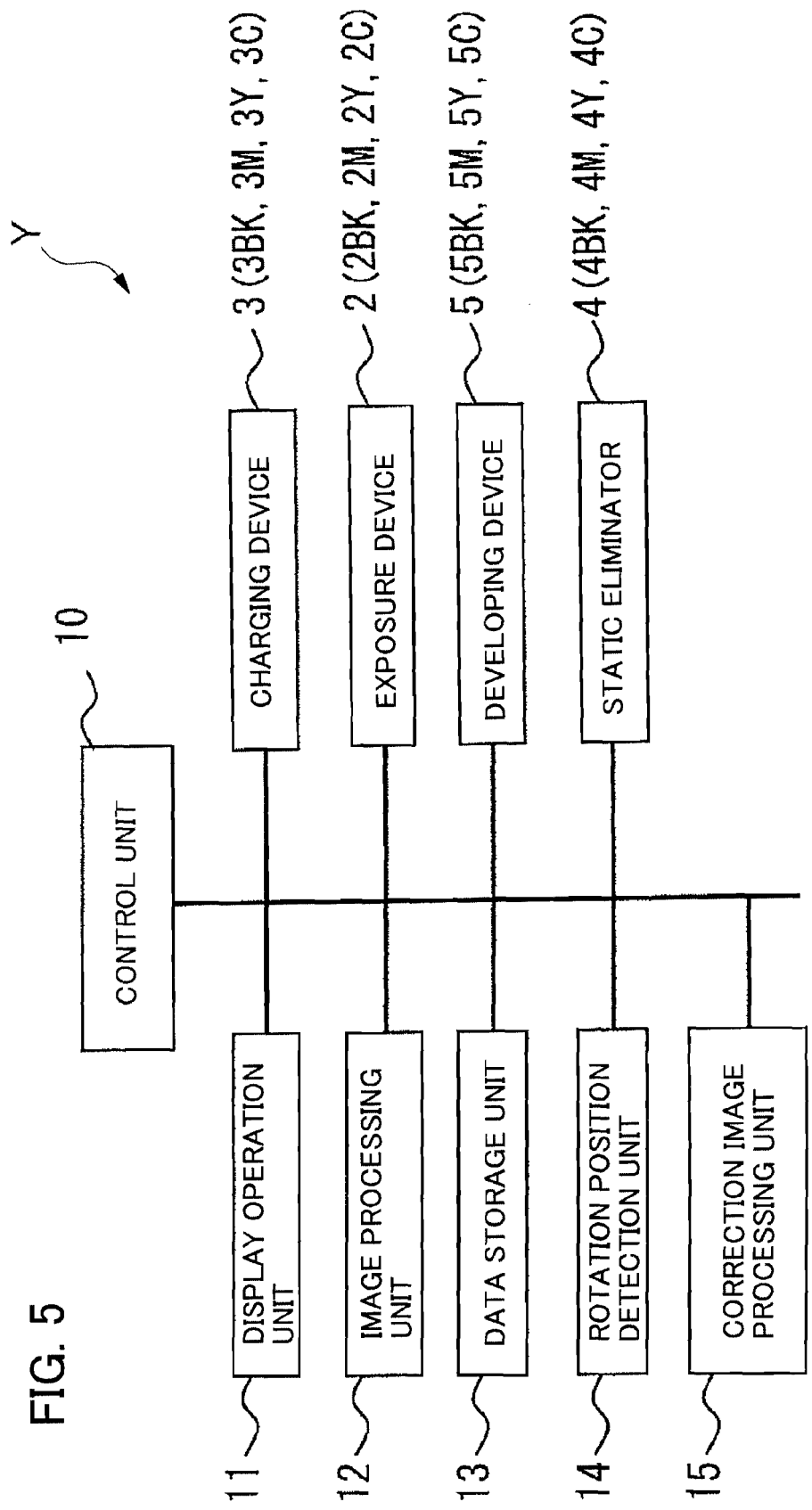
FIG. 5 is a control block diagram of an image forming apparatus according to the present embodiment of the present invention.

Firstly, the overall configuration of an image forming apparatus Y according to this embodiment of the present invention will be described making reference to the control block diagrams in FIG. 4 and FIG. 5.

The image forming apparatus Y is a printer which is an example of a tandem image forming apparatus using four toner colors of black (BK), magenta (M), yellow (Y), and cyan (C).

The image forming apparatus Y includes an image forming unit alpha1 that forms a toner image to thereby form an image on a recording paper, a paper feed unit alpha2 that feeds the recording paper to the image forming unit alpha1, a paper discharge unit alpha3 that discharges the recording paper after formation of the image, and an optical scanning apparatus X.

Image information (a print job) that is sent from an external apparatus such as a personal computer and received by a communication unit (not illustrated) is converted by an image processing unit 12 described below to an pixel gradation that is light and shade value information in relation to each pixel corresponding to the four colors of black (BK), magenta (M), yellow (Y), and cyan (C).

The image forming unit alpha1 is configured from four photosensitive members 1 that carry images in the four respective colors (black 1BK, magenta 1M, yellow 1Y, and cyan 1C), a charging device 3 (3BK, 3M, 3Y, 3C) that applies a uniform charge to the surface of each photosensitive member 1, an exposure device 2 (2BK, 2M, 2Y, 2C), a developing device 5 (5BK, 5M, 5Y, 5C), an intermediate transfer belt 7, a conveying roller 8 for conveying the recording paper, a fixing device 9 that heats and fixes a toner image transferred onto the recording paper, and a static eliminator 4 (4BK, 4M, 4Y, 4C) that eliminates a charge on the surface of the photosensitive member 1 after transfer of the toner image to the recording paper.

The exposure device 2 (2BK, 2M, 2Y, 2C) writes the electrostatic latent image onto the photosensitive member 1 by illuminating (exposing) each pixel with an exposure amount of light corresponding to the pixel gradation determined by the image processing unit 12 with respect to each surface of the photosensitive member 1 that has been pre-charged by the charging device 4. The developing device 5 (5BK, 5M, 5Y, 5C) develops the electrostatic latent image as a toner image by supplying toner to the electrostatic latent image. The intermediate transfer belt 7 executes sequential transfer of the toner image formed on the surface of each photosensitive member 1, and transfers those toner images to the recording paper.

The optical scanning apparatus X according to the present invention is used to expose and scan a light beam in each color emitted by the exposure device 2 (2BK, 2M, 2Y, 2C) onto the photosensitive member 1 (1BK, 1M, 1Y, 1C). The optical scanning apparatus X will be described in detail below.

The photosensitive member 1 may be exemplified by an a-Si photosensitive member. The a-Si photosensitive member exhibits a high hardness and excellent durability due to stable performance. On the other hand, the a-Si photosensitive member exhibits a relatively strong tendency to exhibit non-uniformity in sensitivity and non-uniformity in application of a charge.

The charging device 3 applies a uniform charge in an axial direction of the surface of the photosensitive member 1. Non-uniformity in the charge of the photosensitive member 1 causes a distribution in the potential (initial potential) after the charging operation (prior to exposure) by the charging device 3.

The exposure device 2 is configured from an LED array in which a plurality of LEDs is arrayed for each individual pixel in the axial direction (main scanning direction) of the photosensitive member 1 (1BK, 1M, 1Y, 1C). Alternatively, the exposure device 2 may be configured by a laser scanning apparatus or the like that scans laser light along the axial direction of the photosensitive member 1.

The development device 5 includes a development roller that supplies toner to the photosensitive member 1. Toner on the development roller is drawn onto the surface of the photosensitive member 1 in response to a potential gap between the potential applied to the development roller (development bias potential) and the potential on the surface of the photosensitive member 1. In this manner, the electrostatic latent image is visualized as a toner image.

The paper feed unit alpha2 includes a paper feed cassette 20, a paper feed roller 6, and the like. Recording paper which is stored in advance in the paper feed cassette 20 is conveyed to the image forming unit alpha1 by rotation of the paper feed roller 6.

The recording paper that is fed from the paper feed unit alpha2 is conveyed by the conveying roller 8. A toner image from the intermediate transfer belt 7 is transferred onto the recording paper. The recording paper with the toner image transferred thereon is conveyed to the fixing device 9, and for example, after heating and fixing by the heating roller or the like onto the recording paper, is conveyed to the paper discharge unit alpha3 and discharged.

Next, the structure of the optical scanning apparatus X according to the present embodiment of the present invention will be described making reference to FIG. 2.

Figure 2:
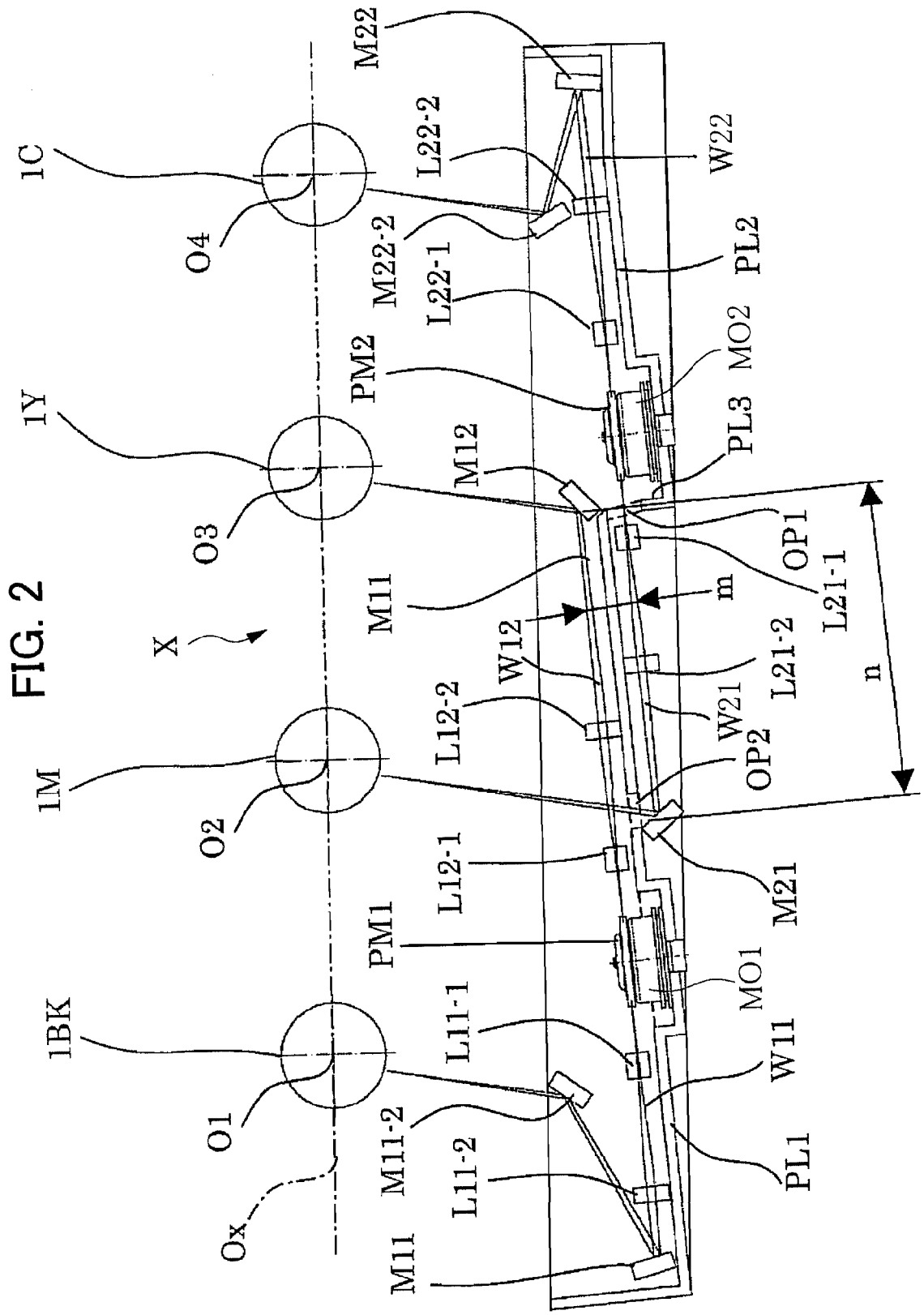
FIG. 2 is a sectional view of an optical scanning apparatus according to a present embodiment of the present invention.

As illustrated in FIG. 2, the optical scanning apparatus X according to the present embodiment includes polygon mirrors PM1, PM2 as an example of two optical scanning units in the same manner as the conventional optical scanning apparatus X1. The two polygon mirrors PM1, PM2 are driven to rotate by respective polygon motors MO1, MO2. The rotation shafts of the two polygon mirrors PM1, PM2 are configured in parallel. Two light sources formed by a laser light source such as an emission diode or the like for each polygon mirror PM are provided corresponding respectively to each polygon mirror PM1, PM2. Although the light sources are not shown, since such light sources are well-known, further description is omitted.

Two primary mirrors are provided on the opposite side to sandwich each polygon mirror PM and reflect light from each light source that is scanned by each polygon mirror PM. The primary mirrors near to the polygon mirror PM1 are denoted as primary mirrors M11 and M12. The primary mirrors near to the polygon mirror PM2 are denoted as primary mirrors M21 and M22.

In the present embodiment, two f-theta lenses L11-1, L11-2 are provided between the polygon mirror PM1 and the primary mirror M11. Two f-theta lenses L12-1, L12-2 are provided between the polygon mirror PM1 and the primary mirror M12. Two f-theta lenses L21-1, L21-2 are provided between the polygon mirror PM2 and the primary mirror M21. Two f-theta lenses L22-1, L22-2 are provided between the polygon mirror PM2 and the primary mirror M22.

Since the above configuration is a conventionally well-known configuration, detailed description thereof will be omitted.

An optical path that extends from the polygon mirror PM1 to the primary mirror M11 will be denoted as W11 in order to describe light that passes through the polygon mirror PM. The optical path that extends from the polygon mirror PM1 to the primary mirror M12 is denoted as W12. The optical path that extends from the polygon mirror PM2 to the primary mirror M21 is denoted as W21. The optical path that extends from the polygon mirror PM2 to the primary mirror M22 is denoted as W22.

In the optical scanning apparatus X according to the present embodiment, in contrast to the conventional optical scanning apparatus X1, the first optical path W12 that extends from a first polygon mirror (for example the polygon mirror PM1) to the primary mirror M12 that corresponds to the first polygon mirror and the second optical path W21 that extends from the second polygon mirror PM2 to the primary mirror M21 that corresponds to the second polygon mirror PM2 are formed to overlap in a vertical orientation in a sectional surface (as illustrated in the figure, the surface of the page of FIG. 2) including both rotation shafts of the two polygon mirrors PM1, PM2. In other words, in the present embodiment, the optical path W12 is parallel to the optical path W21, and an interval m is interposed in a vertical orientation.

As illustrated in FIG. 2, the optical path W12 and the optical path W21 overlap with respect to a length n.

Figure 1:
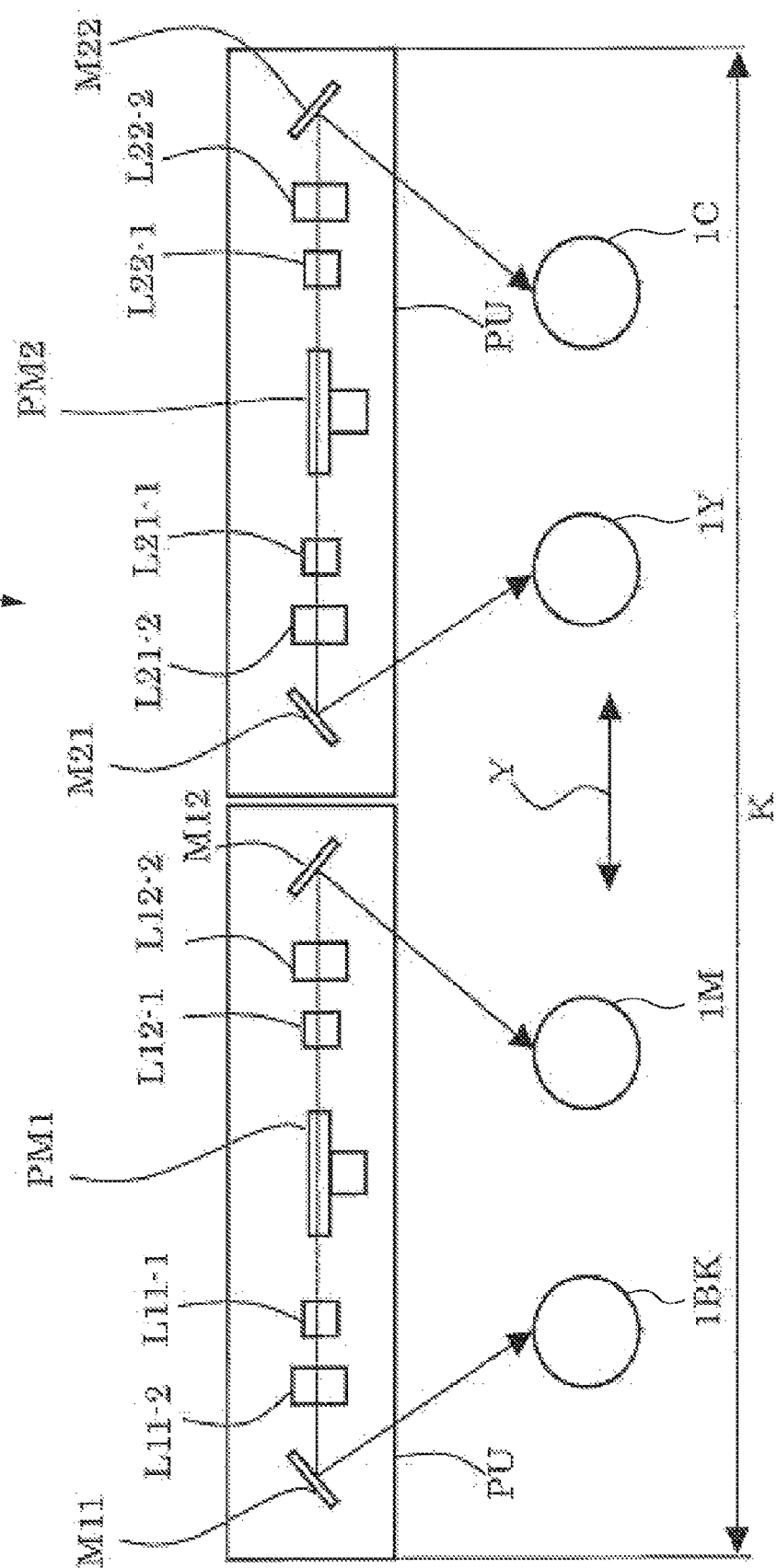
FIG. 1 is a sectional view of a conventional optical scanning apparatus.

In this manner, since the optical path W12 and the optical path W21 overlap with respect to the length n, in comparison to the known optical scanning apparatus X1 as illustrated in FIG. 1, the optical scanning apparatus X according to the present embodiment enables a reduction in the transverse dimension (the direction of orientation of the polygon mirror PM1 and the polygon mirror PM2) at least by a portion corresponding to the overlap distance n.

In further detail, a light beam that is reflected by the primary mirror M11 through the optical path W11 is reflected by the secondary mirror M11-2, and converges onto the photosensitive member 1BK.

A light beam reflected by the primary mirror M12 through the optical path W12 converges on the photosensitive member 1Y.

A light beam reflected by the primary mirror M21 through the optical path W21 converges on the photosensitive member 1M.

A light beam that is reflected by the primary mirror M22 through the optical path W22 is reflected by the secondary mirror M22-2, and converges onto the photosensitive member 1C.

In the optical scanning apparatus X according to the present embodiment as illustrated in FIG. 2, the first optical path W12 and the second optical path W21 are inclined in relation to the center line Ox that passes through the axial center O1, O2, O3, O4 of all photosensitive members 1 (1BK, 1M, 1Y, 1C) that are respectively illuminated with light. However the invention is not limited in this respect. As illustrated in FIG. 3B, the first optical path W12 and the second optical path W21 may be formed in parallel. The formation in parallel of the first optical path W12 and the second optical path W21 enables a reduction in the longitudinal length of the optical scanning apparatus X.

Figure 3A:
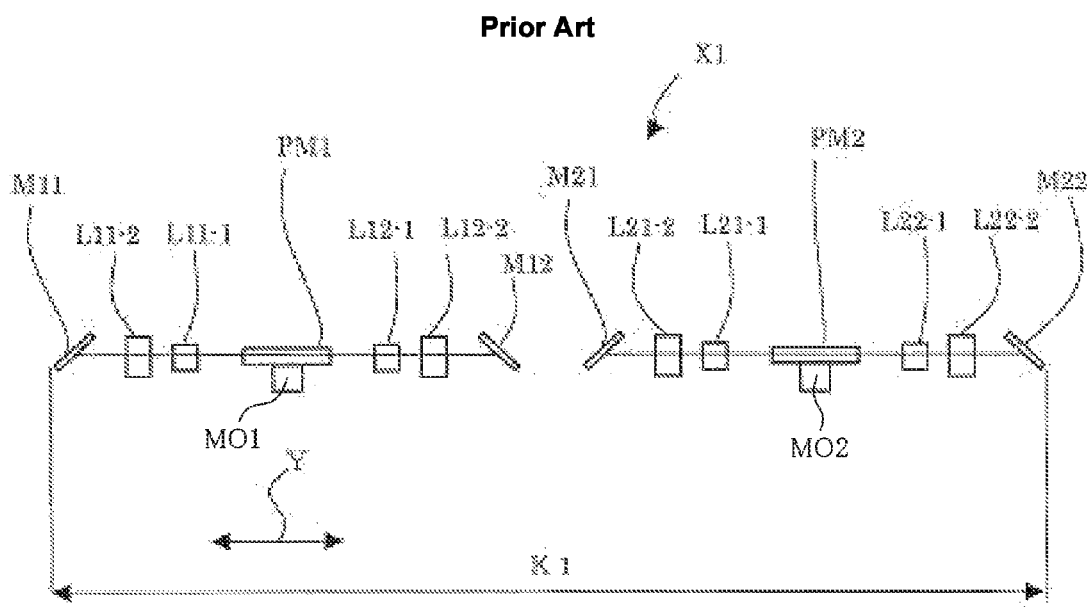
FIG. 3A is a sectional view of the length of a conventional optical scanning apparatus.
Figure 3B:
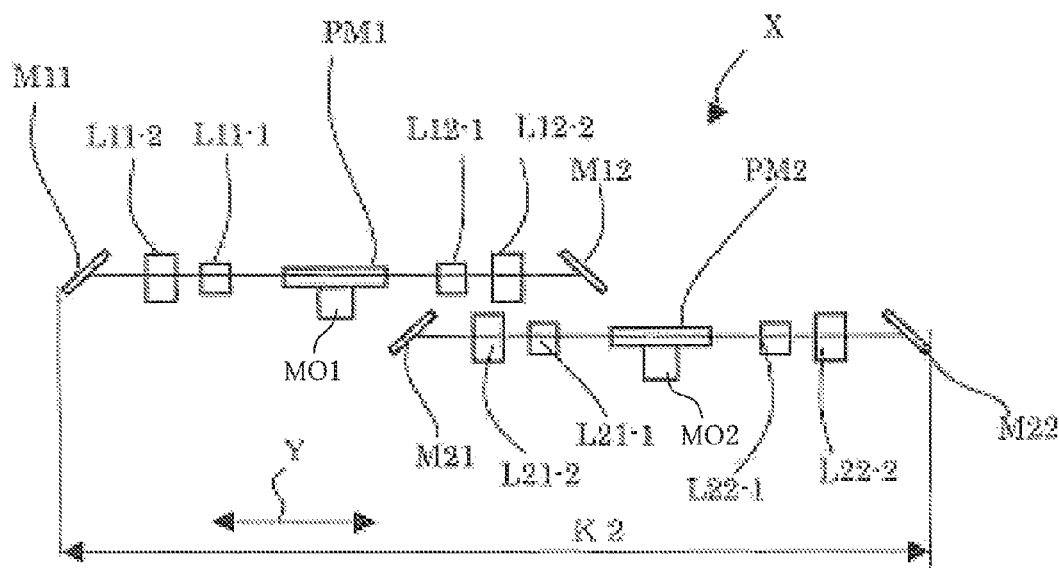
FIG. 3B is a sectional view of the length of an optical scanning apparatus according to the present embodiment of the present invention.

FIG. 3A illustrates only principal units that are extracted from the conventional optical scanning apparatus X1 illustrated in FIG. 1. FIG. 3B illustrates only principal units that are extracted from the optical scanning apparatus X according to the present invention.

In FIG. 3A and FIG. 3B, the distance between the polygon mirror PM and the f-theta lens or the primary mirror is depicted as the same distance. The length of each optical scanning apparatus is depicted as the distance from the primary mirror M11 to the primary mirror M22. As clearly illustrated in FIG. 3A and FIG. 3B, the length K1 of the conventional optical scanning apparatus X1 illustrated in FIG. 3A is clearly longer than the length K2 of the optical scanning apparatus X according to the present invention as illustrated in FIG. 3B.

Furthermore, respective supporting housings (in this embodiment, a supporting plate PL1 and PL2) for supporting each motor MO1, MO2 that drives and rotates the two polygon mirrors PM1, PM2 are disposed in parallel in the optical scanning apparatus X according to the present embodiment. The first optical path W12 and the second optical path W21 are respectively formed on both the front and the back surfaces of one supporting plate PL1. In this manner, the respective formation of the two optical paths W12 and W21 on the front and back surfaces of the supporting housing for the polygon mirror PM enables effective use of the space on the front and back surfaces of the supporting housing (supporting plate). Therefore, the vertical space in the supporting housing can be effectively used to assist in downsizing of the apparatus.

Furthermore, in the present embodiment, the supporting plate PL1 and the supporting plate PL2 that are respective supporting housings disposed in parallel are connected through an upright connection wall PL3 that is configured to be substantially vertical. A first opening OP1 that passes through the second optical path W21 is formed in the connection wall PL3. The first opening OP1 is a path for passage of light that is reflected away from the polygon mirror PM2. Consequently, the first opening OP1 is configured to open in the connection wall PL3, and is formed in proximity to the polygon mirror PM2. Therefore, the range of fluctuation in the light is not very large, and the width of the first opening OP1 may be small.

On the other hand, in the present embodiment, a second opening OP2 that enables passage of light that passes through the first opening OP1 and is reflected by the primary mirror M21 is formed in the upper supporting plate PL1 of the upper and lower supporting plates PL1, PL2.

The second opening OP2 is a path for light that is reflected away by the polygon mirror PM2 and then reflected by the primary mirror M21. As a result, the range of fluctuation of light that passes through the second opening OP2 is considerably large, and considerably larger than the width of the second opening OP2.

In relation to this point, four openings to enable passage of light are also required in the conventional optical scanning apparatus X1. Light after being reflected by all the primary mirrors passes into these openings. Consequently, the openings are substantially large openings. The strength of the support plate is conspicuously reduced in the conventional optical scanning apparatus X1 as illustrated in FIG. 1.

In contrast, in the present embodiment, only two openings OP1 and OP2 pierce the support plates PL1, PL2 and the connection wall PL3, and moreover the opening OP1 is a small opening. Consequently, the overall strength of the supporting plate exhibits a conspicuous improvement in comparison to the conventional optical scanning apparatus. The opening for enabling passage of light that is formed in the supporting housing can be minimized and therefore deterioration in the strength of the supporting housing can be avoided.

What is claimed is:

1. An optical scanning apparatus comprising:
   first and second optical scanning units freely rotatable about first and second rotation shafts disposed in parallel with each other;
   four light sources, two provided for each of the first optical scanning unit and the second optical scanning unit;
   four primary mirrors, two provided opposite to each other with respect to each of the first optical scanning unit and the second optical scanning unit, configured to reflect beams of light emitted by the four light sources that are scanned by the first optical scanning unit and the second optical scanning unit;
   a first supporting plate configured to support a motor for driving and rotating the first optical scanning unit and a second supporting plate configured to support a motor for driving and rotating the second optical scanning unit, the first supporting plate and the second supporting plate being arranged in parallel with each other; and
   a substantially vertical connection wall configured to connect the first supporting plate and the second supporting plate with each other, wherein
   the first supporting plate is placed between a first optical path and a second optical path, the first optical path extending from the first optical scanning unit to one primary mirror that corresponds to the first optical scanning unit and the second optical path extending from the second optical scanning unit to one primary mirror that corresponds to the second optical scanning unit, a first opening through which the second optical path passes is formed in the connection wall, a second opening is formed at the first supporting plate, and the beam of light passing through the first opening and reflected by the one primary minor that corresponds to the second optical scanning unit passes through the second opening.

2. The optical scanning apparatus according to claim 1 wherein the first optical path and the second optical path are formed in parallel with each other.

3. The optical scanning apparatus according to claim 2, wherein the first optical path and the second optical path are configured to be inclined or in parallel with respect to a center line that passes through an axial center of each photosensitive member that is illuminated with each of the beams of light.

4. An image forming apparatus comprising the optical scanning apparatus according to claim 1.

5. The image forming apparatus according to claim 4, further comprising four photosensitive members, wherein the first optical path and the second optical path are configured to be inclined or in parallel with respect to a center line that passes through an axial center of each of the four photosensitive members that is illuminated by each of the four light sources.

* * * * *